United States Patent
Watanabe et al.

(10) Patent No.: US 11,823,580 B2
(45) Date of Patent: Nov. 21, 2023

(54) INFORMATION PROCESSING APPARATUS

(71) Applicant: NTT DOCOMO, INC., Tokyo (JP)

(72) Inventors: Syuusuke Watanabe, Tokyo (JP);
Tadashige Nagae, Tokyo (JP);
Mitsuteru Fukuyama, Tokyo (JP);
Masakazu Hamano, Tokyo (JP);
Takefumi Yamada, Tokyo (JP);
Takashi Hara, Tokyo (JP); Yuichiro
Segawa, Tokyo (JP); Yasuhiro
Kitamura, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 200 days.

(21) Appl. No.: 17/438,036

(22) PCT Filed: Mar. 16, 2020

(86) PCT No.: PCT/JP2020/011353
§ 371 (c)(1),
(2) Date: Sep. 10, 2021

(87) PCT Pub. No.: WO2020/189606
PCT Pub. Date: Sep. 24, 2020

(65) Prior Publication Data
US 2022/0148435 A1 May 12, 2022

(30) Foreign Application Priority Data
Mar. 18, 2019 (JP) .................. 2019-049803

(51) Int. Cl.
G08G 5/00 (2006.01)
G06V 20/17 (2022.01)
(Continued)

(52) U.S. Cl.
CPC .......... *G08G 5/003* (2013.01); *B64C 39/024* (2013.01); *B64D 47/08* (2013.01); *G06V 10/60* (2022.01);
(Continued)

(58) Field of Classification Search
CPC .... G08G 5/003; G08G 5/0069; G08G 5/0034; B64C 39/024; B64D 47/08; G06V 10/60;
(Continued)

(56) References Cited

U.S. PATENT DOCUMENTS
2016/0139596 A1 5/2016 Na et al.

FOREIGN PATENT DOCUMENTS
JP 2018041256 A 3/2018

OTHER PUBLICATIONS

Rakha, Tarek, and Alice Gorodetsky. "Review of Unmanned Aerial System (UAS) applications in the built environment: Towards automated building inspection procedures using drones." Automation in Construction 93 (2018): 252-264. (Year: 2018).*

(Continued)

*Primary Examiner* — Alan D Hutchinson
(74) *Attorney, Agent, or Firm* — DILWORTH IP, LLC

(57) ABSTRACT

Time slot specifying unit reads out facility information of a facility to be inspected (specifically, a base station ID of a base station whose previous inspection day is included in a past predetermined period) from facility information storage unit. Daytime information acquiring unit acquires daytime information at positions at which base stations to be inspected are installed. Time slot specifying unit specifies non-backlight time slots based on the read-out facility information and the acquired daytime information. Operation plan generating unit generates an operation plan of drone in which facilities are shot in the specified non-
(Continued)

backlight time slots. Operation plan outputting unit outputs the generated operation plan.

9 Claims, 11 Drawing Sheets

(51) Int. Cl.
    *G06V 10/60*         (2022.01)
    *G06V 20/10*         (2022.01)
    *B64C 39/02*         (2023.01)
    *B64D 47/08*         (2006.01)
    *B64U 101/30*       (2023.01)

(52) U.S. Cl.
    CPC ............ *G06V 20/17* (2022.01); *G06V 20/176* (2022.01); *G08G 5/0069* (2013.01); *B64U 2101/30* (2023.01)

(58) Field of Classification Search
    CPC ...... G06V 20/17; G06V 20/176; G06V 20/52; B64U 2101/30; G01C 21/34
    See application file for complete search history.

(56) References Cited

OTHER PUBLICATIONS

Notice of Reasons for Refusal issued in Japanese Patent Application No. 2021-507332, dated Oct. 19, 2022, dated Oct. 25, 2022.
International Search Report issued in corresponding PCT Application No. PCT/JP2020/011353, dated Jun. 9, 2020.

\* cited by examiner

| BASE STATION ID | BASE STATION POSITION | SHOOTING DIRECTION INFORMATION | PREVIOUS INSPECTION DAY |
|---|---|---|---|
| K00001 | ... | ... | ... |
| K00002 | ... | ... | ... |
| K00003 | ... | ... | ... |
| K00004 | ... | ... | ... |
| K00005 | ... | ... | ... |
| ... | ... | ... | ... |

```
OPERATION PLAN SCREEN
SHOOTING DAY: 2019/xx/xx
SHOOTING TARGET: BASE STATION 51, 54, 53
SHOOTING TIME AND MOVEMENT TIME: SEE BELOW
```

| BASE STATION ID | BASE STATION POSITION | SHOOTING DIRECTION INFORMATION | PREVIOUS INSPECTION DAY | INSTALLATION DATE |
|---|---|---|---|---|
| K00001 | ... | ... | ... | ... |
| K00002 | ... | ... | ... | ... |

| DEGRADATION PERIOD | BACKLIGHT TIME SLOT LENGTH |
|---|---|
| LESS THAN Th1 | 50 MINUTES |
| Th1 OR MORE AND LESS THAN Th2 | 60 MINUTES |
| Th2 OR MORE | 70 MINUTES |

FIG. 13

| LOCATIONAL CONDITIONS | BACKLIGHT TIME SLOT LENGTH |
|---|---|
| ALONG A COAST | 50 MINUTES |
| NOT ALONG A COAST | 60 MINUTES |

FIG. 14

| SPECIFIC FUNCTION | BACKLIGHT TIME SLOT LENGTH |
|---|---|
| NONE | 60 MINUTES |
| LENS IMMUNE TO BACKLIGHT | 50 MINUTES |
| EXPOSURE CORRECTION FUNCTION/DAYTIME SYNCHRONIZING FUNCTION | 40 MINUTES |

FIG. 15

| BASE STATION ID | BASE STATION POSITION | SHOOTING DIRECTION INFORMATION | PREVIOUS INSPECTION DAY | SHOOTING TIME |
|---|---|---|---|---|
| K00001 | ... | ... | ... | ... |
| K00002 | ... | ... | ... | ... |

FIG. 16 ated to the present invention.
INFORMATION PROCESSING APPARATUS

TECHNICAL FIELD

The present invention relates to a technique for supporting operation of flying bodies.

BACKGROUND

As a technique for supporting operation of flying bodies, Japanese Patent Application No. 2018-41256A discloses a technique for creating a flight plan according to the constraint where only a flight in one direction and changes to altitude are possible, the direction and the altitude range being determined in advance in correspondence with a predetermined altitude range based on current place coordinates and destination coordinates of a drone in flight.

SUMMARY OF INVENTION

There are various methods of using a flying body such as a drone, and the flying body is also used to inspect the state of a facility such as a base station, a bridge, or a building by shooting images of the facility, for example. In order to perform inspection, it is desirable that the facility is shot in a plurality of directions, but in a backlight condition, the brightness of the facility in a shot image decreases, and the state of the facility is not easily determined.

Accordingly, an object of the present invention is to generate an operation plan with which shooting of a facility by a flying body is unlikely to be influenced by backlight.

In order to achieve the object described above, the present invention provides an information processing apparatus including a specifying unit configured to specify, for a facility for which at least one shooting direction in which a flying body shoots the facility is determined, a first time slot in which a backlight condition fails to be satisfied in the at least one shooting direction for daylight shooting; and a generating unit configured to generate an operation plan for the flying body to shoot the facility in the specified first time slot.

According to the present invention, an operation plan with which shooting of a facility by a flying body is unlikely to be influenced by backlight can be generated.

BRIEF DESCRIPTION OF DRAWINGS

FIG. 13 is a diagram illustrating an example of a time slot table according to the present invention.

FIG. 14 is a diagram illustrating an example of a time slot table of a modification according to the present invention.

FIG. 15 is a diagram illustrating an example of a time slot table of a modification according to the present invention.

FIG. 16 is a diagram illustrating an example of facility information of a modification according to the present invention.

DETAILED DESCRIPTION

1. Embodiment

Figure 1:
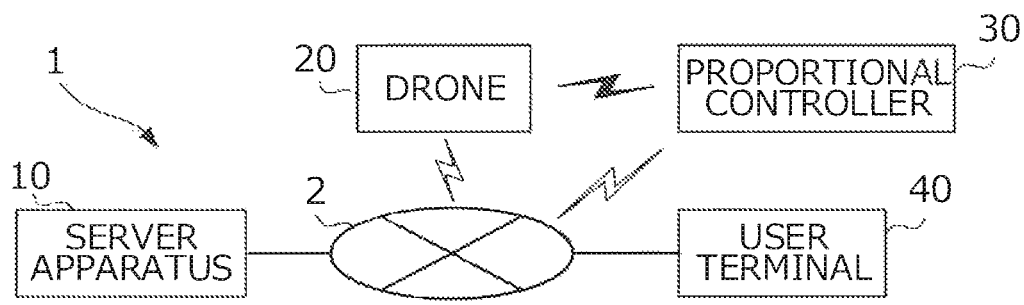
FIG. 1 is a diagram illustrating an example of the overall configuration of a facility inspection system according to an embodiment of the present invention.

FIG. 1 is a diagram illustrating an example of the overall configuration of facility inspection system 1 according to an embodiment. Facility inspection system 1 is a system for supporting inspection of a facility based on an image shot by a flying body equipped with a shooting function. The inspection target is a facility that is regularly inspected in order to investigate the degree of degradation and damage, and is a bridge, a building, or a tunnel, for example. In the present embodiment, a case where the inspection target is a base station for mobile communication will be described.

Facility inspection system 1 includes network 2, sever apparatus 10, drone 20, proportional controller 30, and user terminal 40. Network 2 is a communications system including a mobile communications network, the Internet, and the like, and relays exchanging of data between apparatuses that access the system. Network 2 is accessed by server apparatus 10 and user terminal 40 through wired communication (may also be wireless communication), and by drone 20 and proportional controller 30 through wireless communication.

Drone 20 is a flying body equipped with the shooting function described above. In the present embodiment, drone 20 is a rotary wing-type flying body that flies by rotating one or more rotors. Although drone 20 can autonomously fly along a determined flight path, in the present embodiment, drone 20 makes a flight according to an operation made by an operator. Drone 20 is deployed in a base such as a business office of an inspection company. Proportional controller 30 (transmitter) is an apparatus that performs proportional control, and is used by the operator to operate drone 20.

Sever apparatus 10 performs processing for generating an operation plan in which a facility to be shot by drone 20, a schedule, a time slot, and the like are determined. Server apparatus 10 is an example of an "information processing apparatus" of the present invention. Many base stations to be inspected are present over a wide area, and therefore sever apparatus 10 generates an operation plan such that shooting work can be performed as efficiently as possible. Sever apparatus 10 notifies user terminal 40 of the generated operation plan, for example.

User terminal 40 is a terminal device used by an inspector, and displays an operation plan received from sever apparatus 10. The inspector performs shooting, after carrying drone 20 to a facility to be inspected, by causing drone 20 to fly according to the displayed operation plan. The inspector is also an operator of drone 20, and is also a carrier of drone 20. The inspector, after completing all scheduled shooting, carries drone 20 back to the base, and performs work such as saving photographic data obtained by shooting. Note that the number of inspectors need not be one, and may also be two or more.

Figure 2:
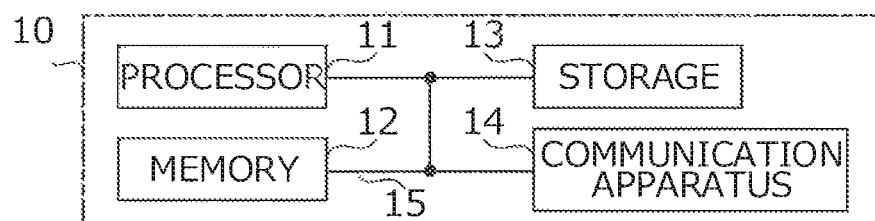
FIG. 2 is a diagram illustrating an example of a hardware configuration of a server apparatus according to the present invention.

FIG. 2 shows an example of a hardware configuration of server apparatus 10. Server apparatus 10 may be configured, physically, as computer apparatus that includes processor 11, memory 12, storage 13, communications apparatus 14, bus 15, and the like. Note that in the following description, the term "apparatus" used here can be replaced with "circuit", "device", "unit", or the like.

Also, one or more of each apparatus may be included, and some apparatus may be omitted. Processor 11 controls the computer as a whole by causing an operating system to run, for example. Processor 11 may be constituted by a central processing unit (CPU) including an interface with peripheral apparatuses, a control apparatus, a computational operation apparatus, registers, and the like.

For example, a baseband signal processing unit or the like may be realized by processor 11. Also, processor 11 reads a program (program code), a software module, data, and the like from at least one of storage 13 and communications apparatus 14 into memory 12, and executes various processing according to the read-out program and the like. A program that causes a computer to execute at least some of the operations described in the above embodiment is used as the program.

Although the various processing described above is described as executed by one processor 11, the various processing may be executed simultaneously or sequentially by two or more processors 11. Processor 11 may be implemented using one or more chips. Note that a program may be transmitted from a network over an electrical communication line. Memory 12 is a computer-readable recording medium.

Memory 12 may be constituted by at least one of ROM (Read Only Memory), EPROM (Erasable Programmable ROM), EEPROM (Electrically Erasable Programmable ROM), RAM (Random Access Memory), and so on, for example. Memory 12 may be called as "register", "cache", "main memory" (a main storage apparatus), or the like. Memory 12 can store an executable program (program code) for implementing a wireless communication method according to an embodiment of the present disclosure, software modules, and the like.

Storage 13 is a computer-readable recording medium, and for example, may be constituted by at least one of an optical disk such as a CD-ROM (Compact Disc ROM), a hard disk drive, a flexible disk, a magneto-optical disk (for example, a compact disk, a digital versatile disk, or a Blu-ray (registered trademark) disk), a smartcard, a flash memory (for example, a card, a stick, or a key drive), a Floppy (registered trademark) disk, a magnetic strip, and the like.

Storage 13 may be called an auxiliary storage apparatus. The above-mentioned storage medium may be a database, a server, or another appropriate medium including memory 12 and/or storage 13, for example. Communications apparatus 14 is hardware for communicating between computers over a wired and/or wireless network (a transmitting/receiving apparatus). Communication apparatus 14 may also be referred to as a network device, a network controller, a network card, or a communication module, for example.

For example, the transmitting/receiving antenna, amplifier unit, transmitting/receiving unit, transmission path interface, and the like mentioned above may be realized by communication apparatus 14. The transmitting/receiving unit may be implemented by physically or logically separating the transmission unit and the receiving unit. Further, apparatuses such as processor 11 and memory 12 are configured to be connected by bus 15 for communicating information. Bus 15 may be configured using a single bus, or may be configured by using a different bus for each apparatus.

Figure 3:
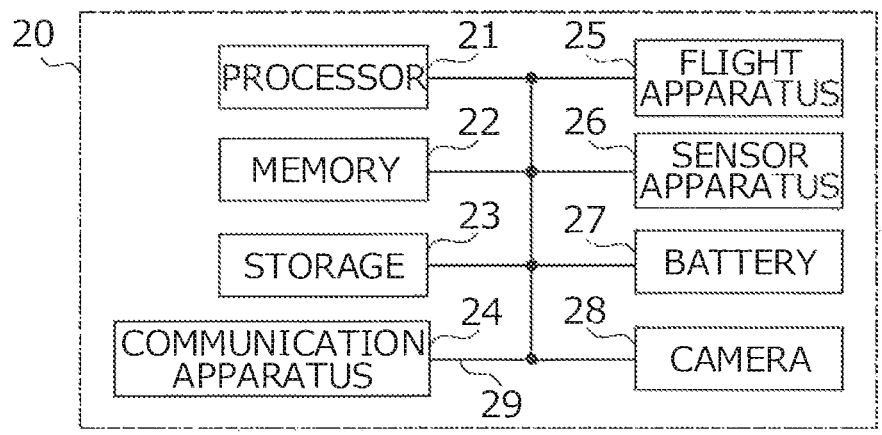
FIG. 3 is a diagram illustrating an example of a hardware configuration of a drone according to the present invention.

FIG. 3 is a diagram showing an example of a hardware configuration of drone 20. Physically, drone 20 may be configured as a computer apparatus including processor 21, memory 22, storage 23, communication apparatus 24, flight apparatus 25, sensor apparatus 26, battery 27, camera 28, bus 29, and the like. Hardware having the same name as that shown in FIG. 2 such as processor 21 is the same kind of hardware as that shown in FIG. 2, but differs in performance, specifications, and the like.

Communication apparatus 24 has a function of communicating, in addition to communicating with network 2, with proportional controller 30 (for example, a function of wireless communications by radio waves in the 2.4 GHz band). Flight apparatus 25 is an apparatus that includes a motor, a rotor, and the like, and causes the self-drone to fly. Flight apparatus 25 can move the self-drone in any direction in the air, or can make the self-drone stationary (hover).

Sensor apparatus 26 is an apparatus having a sensor group that acquires information necessary for flight control. Sensor apparatus 26 includes, for example, a position sensor that measures the position (latitude and longitude) of the self-drone, a direction sensor that measures the direction drone 20 is facing (the direction in which a forward direction that is defined for the drone is directed), and an altitude sensor that measures the altitude of the self-drone.

Also, sensor apparatus 26 includes a speed sensor that measures the speed of drone 20 and an inertial measurement sensor (IMU (Inertial Measurement Unit)) that measures the angular velocity around three axes and the acceleration in three directions. Battery 27 is an apparatus that accumulates electric power and supplies the electric power to the units of drone 20. Camera 28 includes an image sensor, optical components, and the like, and photographs objects that are present in a direction in which a lens is directed. Camera 28 is an example of a "shooting means" of the present invention.

Figure 4:
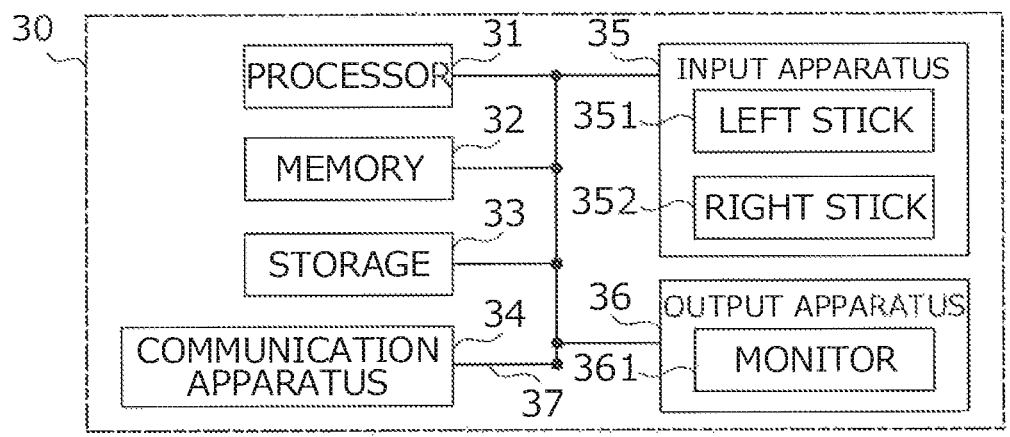
FIG. 4 is a diagram illustrating an example of a hardware configuration of a proportional controller according to the present invention.

FIG. 4 shows an example of a hardware configuration of proportional controller 30. Proportional controller 30 may be configured as a physical computer apparatus including processor 31, memory 32, storage 33, communication apparatus 34, input apparatus 35, output apparatus 36, bus 37, and the like. Hardware having the same name as that shown in FIG. 2 such as processor 31 is the same kind of hardware as that shown in FIG. 2, but differs in performance, specifications, and the like.

Input apparatus 35 is an input device (e.g., a switch, a button, a sensor, and the like) for receiving input from an external device. In particular, input apparatus 35 includes left stick 351 and right stick 352, and receives the operations performed on the sticks as operations for moving drone 20 in a front and back direction, an up and down direction, a left and right direction, and a rotation direction of drone 20. Output apparatus 36 is an output device (e.g., a monitor 361, a speaker, an LED (Light Emitting Diode) lamp, and the like) for performing output to an external device. Note that input apparatus 35 and output apparatus 36 may also be integrally configured (e.g., monitor 361 is a touchscreen).

Figure 5:
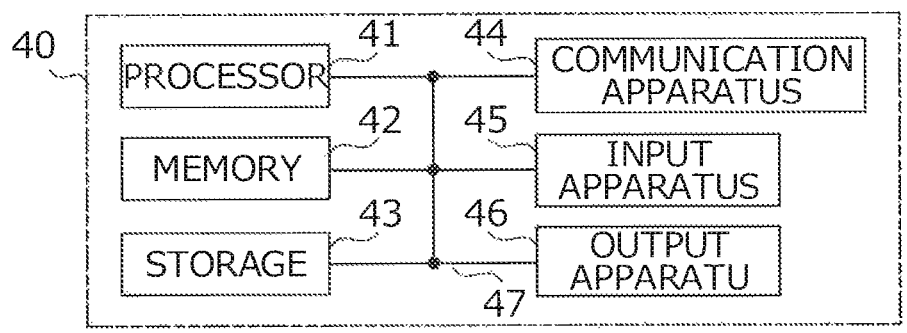
FIG. 5 is a diagram illustrating an example of a hardware configuration of a user terminal according to the present invention.

FIG. 5 shows an example of a hardware configuration of user terminal 40. User terminal 40 may be configured as a physical computer apparatus including processor 41, memory 42, storage 43, communication apparatus 44, input apparatus 45, output apparatus 46, bus 47, and the like. Hardware having the same name as that shown in FIG. 2 or 4 such as processor 41 is the same kind of hardware as that shown in FIG. 2 or 4, but differs in performance, specifications, and the like. Note that input apparatus 45 may also be a keyboard, a mouse, a microphone, or the like in addition to the input device described above, for example.

Also, each apparatus described above may also be constituted by including hardware such as a microprocessor, a digital signal processor (DSP), an ASIC (Application Specific Integrated Circuit), a PLD (Programmable Logic Device), or an FPGA (Field Programmable Gate Array). Also, in each apparatus described above, some of or all of the functional blocks may be realized by hardware. For example, processor 11 may be implemented by at least one piece of hardware.

Functions in the apparatuses included in facility inspection system 1 are realized, by causing predetermined software (programs) to be loaded on hardware such as the respective processors and memories, by the processors performing computational operations to control communication by the respective communication apparatuses, to control at least one of reading and writing of data in the memories and storages, and the like.

Figure 6:
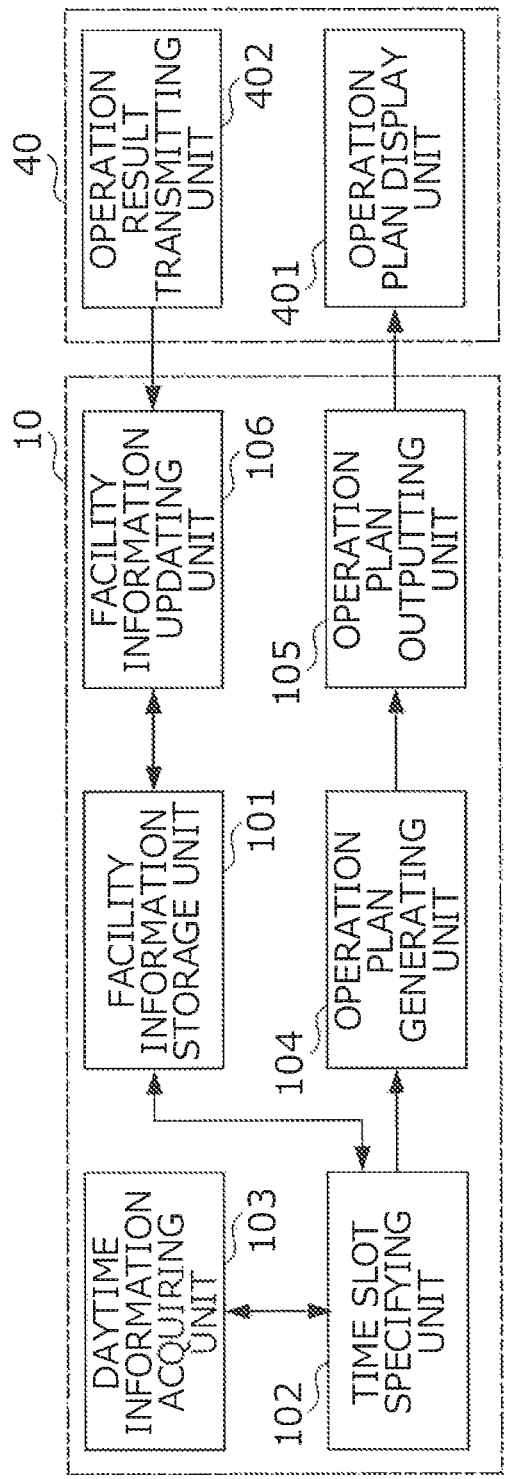
FIG. 6 is a diagram illustrating a functional configuration realized by the apparatuses according to the present invention.

FIG. 6 shows a functional configuration realized by the apparatuses. Sever apparatus 10 includes facility information storage unit 101, time slot specifying unit 102, daytime information acquiring unit 103, operation plan generating unit 104, operation plan outputting unit 105, and facility information updating unit 106. User terminal 40 includes operation plan display unit 401 and operation result transmitting unit 402. Facility information storage unit 101 stores information regarding a facility to be inspected (facility information). Facility information storage unit 101 stores information regarding a base station as the facility information, in the present embodiment.

Figures 7, 8A:
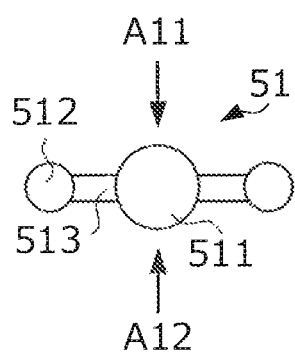
FIG. 7 is a diagram illustrating an example of facility information according to the present invention.
FIG. 8A is a diagram illustrating an example of shooting directions according to the present invention.

FIG. 7 shows an example of the facility information. Facility information storage unit 101 stores facility information in which a base station ID, a base station position, shooting direction information, and previous inspection date are associated, in the example in FIG. 7. Facility information storage unit 101 stores identification information assigned to each base station in advance as the base station ID, and the latitude and longitude of the facility in which the base station is installed as the base station position, for example.

Facility information storage unit 101 stores the date on which shooting for inspection was last performed on a facility to be inspected as the previous inspection day. Also, facility information storage unit 101 stores information indicating the direction in which the camera is oriented when performing shooting for inspecting the target facility (hereinafter, referred to as an "shooting direction") as the shooting direction information. In the present embodiment, the following three shooting directions are determined according to the shape of a base station.

Figure 8B:
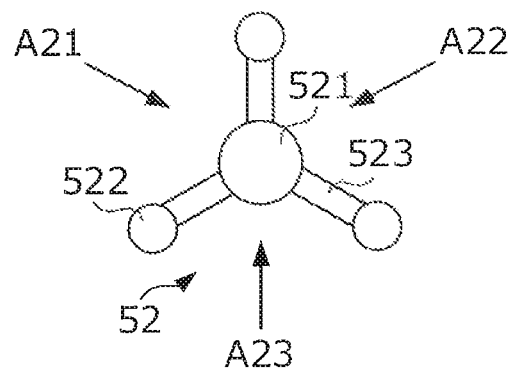
FIG. 8B is a diagram illustrating an example of shooting directions according to the present invention.
Figure 8C:
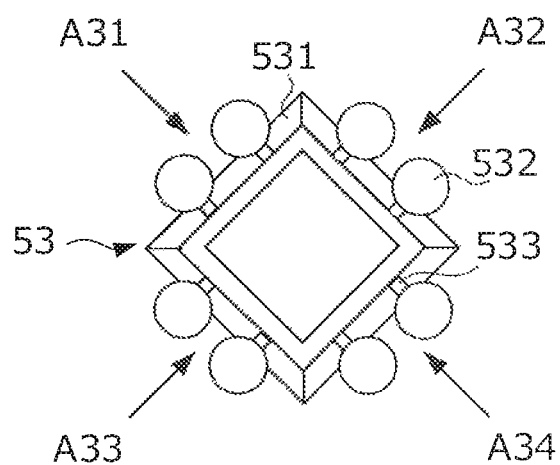
FIG. 8C is a diagram illustrating an example of shooting directions according to the present invention.

FIGS. 8A to 8C show examples of the shooting directions. In FIG. 8A, shooting directions A11 and A12 in base station 51 viewed from vertically above are shown. Base station 51 includes support pillar 511, two antennas 512, and supporting members 513 for supporting the antennas 512. In base station 51, two antennas 512 are provided so as to be on a line with support pillar 511 being interposed therebetween. In the case of base station 51, directions that are orthogonal to the direction in which antennas 512 and support pillar 511 are aligned and extend along the horizontal direction are determined as shooting directions A11 and A12 such that there is minimal overlap between the subjects.

In FIG. 8B, shooting directions A21, A22, and A23 with respect to base station 52 viewed vertically above are shown. Base station 52 includes support pillar 521, three antennas 522, and supporting members 523 for supporting the antennas 522. In base station 52, three antennas 522 are provided so as to be positioned at apexes of an equilateral triangle with support pillar 521 being at the center. In base station 52 as well, directions that are orthogonal to the sides of the equilateral triangle and extending along the horizontal direction are determined as shooting directions A21, A22, and A23 such that there is minimal overlap between the subjects.

In FIG. 8C, shooting directions A31, A32, A33, and A34 with respect to base station 53 viewed vertically above are shown. Base station 53 includes steel tower 531, eight antennas 532, and supporting members 533 for supporting the antennas. Steel tower 531 is shaped as a hollow truncated square pyramid, and two antennas 532 are provided on each side face of the truncated square pyramid in a direction in which the corresponding side face is oriented. In base station 53, directions that are orthogonal to the sides of the square cross section of the truncated square pyramid and extending along the horizontal direction are determined as shooting directions A31, A32, A33, and A34 such that two antennas 532 on each side and the faces of steel tower 531 can be clearly imaged.

Facility information storage unit 101 stores information in which the shooting directions determined as in the examples in FIGS. 8A to 8C, with respect to each facility, are represented as values in a range of 360 degrees with the true north being 0 degrees (for example, the true east is 90 degrees, and northwest is 315 degrees) as shooting direction information, for example. Facility information storage unit 101 stores shooting direction information indicating two shooting directions in the case of the two direction-type base station shown in FIG. 8A, shooting direction information indicating three shooting directions in the case of the three direction-type base station shown in FIG. 8B, and shooting direction information indicating four shooting directions in the case of the four direction-type base station shown in FIG. 8C.

As described above, the base station is a facility for which shooting directions when being shot by drone 20 are determined. Time slot specifying unit 102 specifies, with respect to a base station to be shot, a time slot (non-backlight time slot) in which a backlight condition is not satisfied in any shooting direction for daylight shooting. Time slot specifying unit 102 is an example of a "specifying unit" of the present invention. Note that the number of shooting directions is in a range of two to four in the examples in FIGS. 8A to 8C, but the number may be one or five or more. In short, for a facility to be inspected, at least one shooting direction need only be determined.

In the present embodiment, time slot specifying unit 102 reads out base station IDs of base stations for which the associated previous inspection day is included in a past predetermined period, from facility information storage unit 101. For example, when inspection is performed every five years, a period of one year five years ago (if the current year is 2018, 2013) is the past predetermined period. For each of the base stations identified by the read out base station IDs, time slot specifying unit 102 specifies a non-backlight time slot based on information regarding sunrise and sunset in each area (information indicating the period in which the sun is up, that is daytime, and hereinafter referred to as "daytime information").

Daytime information acquiring unit 103 acquires daytime information at the position at which each base station is installed. Specifically, daytime information acquiring unit 103 acquires daytime information indicating sunrise time, sunset time, sunrise direction, and sunset direction for each date in a year. With the daytime information, the sun direction at the time of interest and the time at which the sun is in the direction of interest can be calculated, by associating angles in a range from the sunrise direction to the sunset direction on the inspection day with times in a range from the sunrise time to the sunset time.

Daytime information acquiring unit 103 acquires daytime information for each base station using a service for providing daytime information from information regarding latitude and longitude, for example. Note that the configuration may be such that daytime information acquiring unit 103 stores a table in which the latitude and longitude are associated with corresponding daytime information in advance, and acquires the daytime information using the stored table. Also, the sunrise time and sunset time merely change about one minute day by day, and therefore daytime information acquiring unit 103 acquires daytime information for dates at intervals of several days instead of daytime information for all dates.

Daytime information acquiring unit 103 acquires daytime information based on a request from time slot specifying unit 102. Upon reading out a base station ID, time slot specifying unit 102 makes a request for daytime information for a base station identified by the read-out base station ID to daytime information acquiring unit 103. When the operation plan is generated at fixed intervals (every day, every several days, every week, every month, or the like), time slot specifying unit 102 requests daytime information for a period corresponding to the intervals at which the operation plan is generated (e.g., when generated every week, daytime information for one week therefrom).

Daytime information acquiring unit 103 acquires the requested daytime information for the base station for a requested period, and supplies the acquired daytime information to time slot specifying unit 102. Time slot specifying unit 102 specifies a time slot in which the shooting direction matches the direction of the sun as the time slot (backlight time slot) in which the backlight condition is achieved, for each base station and for each date, from the shooting direction information associated with the read-out base station ID and the direction of the sun at each time indicated by the supplied daytime information.

In the present embodiment, time slot specifying unit 102 specifies a time slot including a predetermined period of time before and after the time at which the shooting direction matches the direction of the sun (period at which the influence of backlight is large, 30 minutes, for example) as the backlight time slot. For example, when shooting direction A12 of base station 51 shown in FIG. 8A is oriented true south, the time at which the shooting direction matches the direction of the sun is the time at which the sun is true south at the base station position of base station 51 (time at which the sun passes the true south direction).

Time slot specifying unit 102 calculates the time at which the sun is true south from the acquired daytime information for base station 51, and specifies a time slot including a predetermined period of time before and after the calculated time at which the sun is true south as the backlight time slot. Time slot specifying unit 102 specifies time slots obtained by removing the backlight time slot specified as described above from the daytime time slot (time slot from sunrise to sunset) indicated by the daytime information as non-backlight time slots (time slots in which the backlight condition is not satisfied in any shooting direction in daytime shooting). The non-backlight time slot is an example of a "first time slot" of the present invention.

Time slot specifying unit 102 supplies the specified non-backlight time slots to operation plan generating unit 104 along with the base station ID, base station position, shooting direction information, and date (date of daytime information used for specifying the non-backlight time slot) of the corresponding base station. Operation plan generating unit 104 generates an operation plan for drone 20 such that the facility is shot in the non-backlight time slots specified by time slot specifying unit 102. Operation plan generating unit 104 is an example of a "generating unit" of the present invention.

Operation plan generating unit 104 first extracts a combination of base stations in which the sum of shooting times and movement times for the respective base stations is less than a threshold value (e.g., business hours) when movement is performed along a route that starts at a base (such as a business office of an inspection company) in which drone 20 is deployed, passes through two or more base stations sequentially, and returns to the base, based on the supplied base station positions. The movement as mentioned here is movement by a car carrying drone 20 and an inspector, in the present embodiment.

Figure 9A:
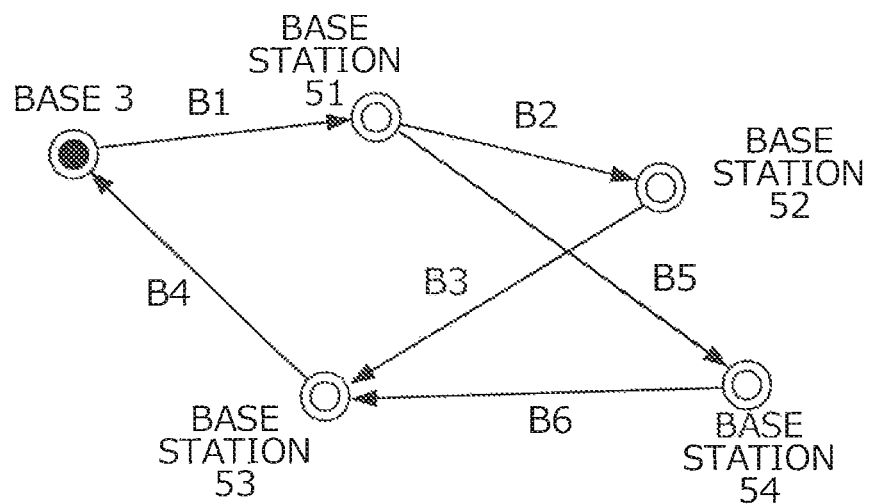
FIG. 9A is a diagram illustrating an example of a combination of extracted base stations according to the present invention.
Figure 9B:
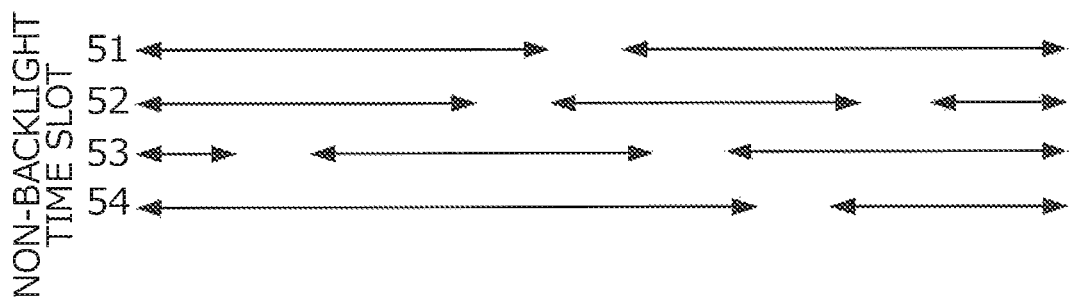
FIG. 9B is a diagram illustrating an example of a combination of extracted base stations according to the present invention.
Figure 9C:
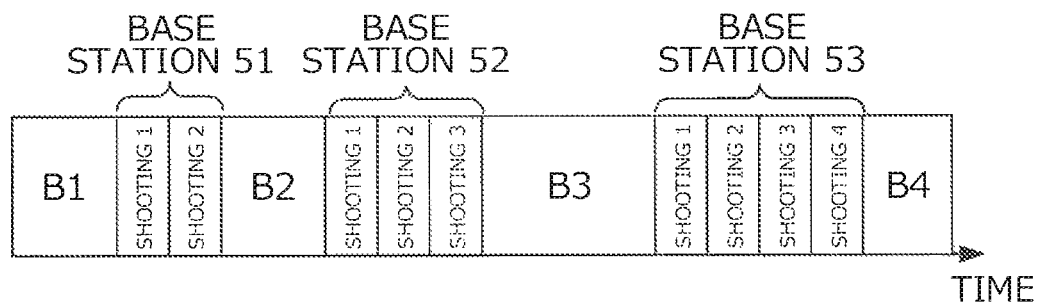
FIG. 9C is a diagram illustrating an example of a combination of extracted base stations according to the present invention.

FIGS. 9A to 9D show examples of the combination of extracted base stations. In FIG. 9A, base 3 in which drone 20 is deployed and base stations 51, 52, 53, and 54 are shown. In FIG. 9B, the non-backlight time slots of the respective base stations are shown. In FIG. 9C, the sum of shooting times and movement times for the respective base stations are shown when movement is performed along a route that starts base 3, passes through base stations 51, 52, and 53 sequentially through movement paths B1, B2, B3, and B4, and returns to the base.

Figure 9D:
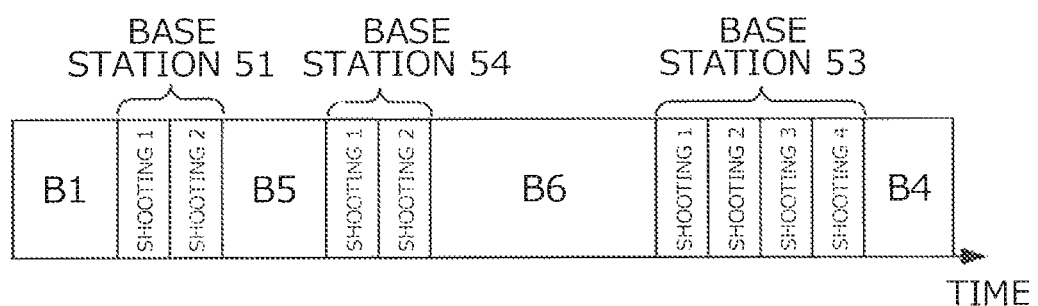
FIG. 9D is a diagram illustrating an example of a combination of extracted base stations according to the present invention.

In FIG. 9D, the sum of shooting times and movement times for the respective base stations are shown when movement is performed along a route that starts at base 3, passes through base stations 51, 54, and 53 sequentially through movement paths B1, B5, B6, and B4, and returns to the base. As shown in FIGS. 9C and 9D, in the present embodiment, operation plan generating unit 104 obtains the shooting time for a base station by calculating shooting time for one direction×number of shooting directions. The shooting time for one direction is a shooting time in one shooting direction, and is a period of time it takes for drone 20 to climb to a height of the base station and then land, for example.

Although the sum of movement paths B5 and B6 is longer than the sum of movement paths B2 and B3, the number of shooting directions for base station 54 is two in contrast to the number of shooting directions for base station 52 being three, and therefore the sum of the shooting times and movement times is less than the threshold value, in the case of FIG. 9D as well. In the example in FIG. 9C, the shooting times (periods of time from shooting start time to shooting end time) for base stations 51 and 53 are included in the non-backlight time slots of the respective base stations, but the shooting time for base station 52 is not included in the non-backlight time slots of base station 52. Therefore, if shooting is performed in the time slots shown in FIG. 9C, it is possible that a backlight condition is achieved.

On the other hand, in the example in FIG. 9D, all of the shooting times of base stations 51, 54, and 53 are included in the non-backlight time slots of the respective base stations. Operation plan generating unit 104 determines a combination for which all the shooting times are included in the non-backlight time slots, out of combinations of the extracted base stations (no shooting time includes a backlight time slot), as the base stations to be shot. Operation plan generating unit 104 generates information indicating the base station IDs indicating the determined base stations to be shot, the shooting day, shooting times, and movement times for the base stations to be shot, as an operation plan.

Operation plan generating unit 104 supplies the generated operation plan to operation plan outputting unit 105. Operation plan outputting unit 105 outputs the operation plan generated by operation plan generating unit 104. Operation plan outputting unit 105 stores information indicating the output destination corresponding to the inspector of drone 20 (IP (Internet Protocol) address of user terminal 40, in the present embodiment), and outputs the operation plan to the output destination indicated by the stored information, for example.

User terminal 40 supplies the operation plan that has been output to operation plan display unit 401. Operation plan display unit 401 displays the operation plan output from sever apparatus 10.

Figures 10, 11, 12:
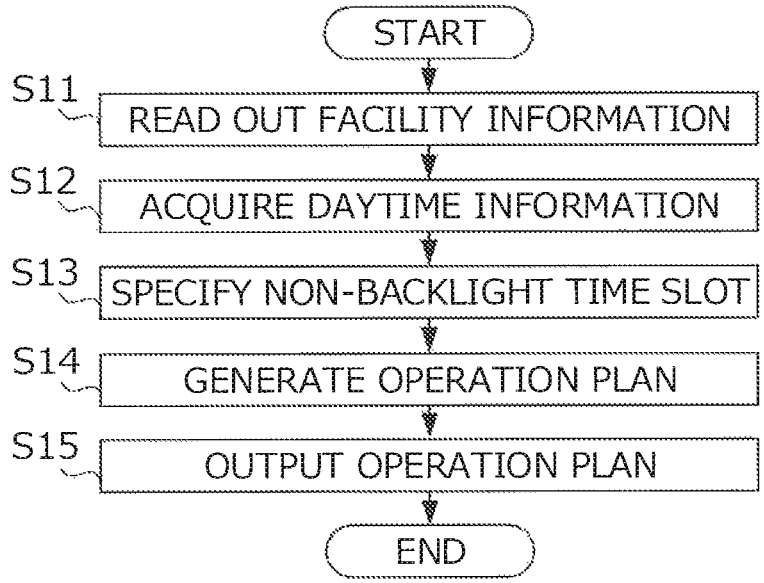
FIG. 10 is a diagram illustrating an example of a displayed operation plan according to the present invention.
FIG. 11 is a diagram illustrating an example of an operating procedure of the apparatuses in output processing according to the present invention.
FIG. 12 is a diagram illustrating an example of facility information of a modification according to the present invention.

FIG. 10 shows an example of the displayed operation plan. In the example in FIG. 10, operation plan display unit 401 displays shooting day, shooting targets (base stations 51, 54, and 53 in the example in FIG. 10), shooting times, and movement times as the operation plan, in an operation plan screen. Note that, although not illustrated in FIG. 10, shooting start time, shooting end time, movement start time, arrival time, and the like may also be displayed.

An inspector takes a photograph of a base station to be shot using drone 20 at the shooting time on the shooting day that are displayed, following the displayed operation plan. The inspector, upon returning to the base after completing shooting of all of the base stations, inputs operation results of drone 20 on the day (information indicating the shot base stations, the shooting day, the shooting time, and the like) to user terminal 40, for example. Operation result transmitting unit 402 of user terminal 40 transmits the operation results of drone 20 input by a user to sever apparatus 10.

Sever apparatus 10 supplies the received operation result to facility information updating unit 106. Facility information updating unit 106 updates the facility information stored in facility information storage unit 101 based on the operation results transmitted from user terminal 40, that is, the operation results of drone 20 that was operated following the operation plan. Facility information updating unit 106 updates the previous inspection day associated with the base station ID of the base station indicated by the operation results with the shooting day indicated by the operation results.

As described above, an operation plan is determined for a predetermined period in time to come (e.g., for one month) by specifying non-backlight time slots based on facility information, and generating and outputting the operation plan. As a result of repeatedly determining operation plans for every predetermined period, shooting and inspection of base stations proceed. A video of a facility shot by drone 20 is transmitted to an apparatus that is not illustrated and saved in the apparatus, and is used for inspection.

The apparatuses included in facility inspection system 1 perform output processing for outputting an operation plan based on the configuration described above.

FIG. 11 shows an example of the operating procedure of the apparatuses in the output processing. The operating procedure in FIG. 11 is started when a time for generating an operation plan has arrived. First, sever apparatus 10 (time slot specifying unit 102) reads out information regarding a facility to be inspected (specifically, base station IDs of base stations whose previous inspection day is included in a predetermined period in the past) from facility information storage unit 101 (step S11).

Next, sever apparatus 10 (daytime information acquiring unit 103) acquires daytime information regarding locations at which the base stations to be inspected are installed (step S12). Next, sever apparatus 10 (time slot specifying unit 102) specifies non-backlight time slots based on the read-out facility information and the acquired daytime information (step S13). Next, sever apparatus 10 (operation plan generating unit 104) generates an operation plan of drone 20 for taking photographs of the facilities in the specified non-backlight time slots (step S14). Also, sever apparatus 10 (operation plan outputting unit 105) outputs the generated operation plan (step S15).

In the present embodiment, an operation plan of drone 20 for taking photographs of facilities only in the non-backlight time slots is generated, as described above. Of course, although the operation may not necessarily be carried out as planned, as a result of using the operation plan of the present embodiment, the likelihood that photographs are taken in a backlight condition is lower than the case of using an operation plan for taking photographs of a facility in a backlight time slot from the beginning. That is, according to the present embodiment, an operation plan with which taking photographs of base stations by drone 20 is less likely to be influenced by backlight can be generated, than the case where the backlight time slot is not considered.

2. Modifications

The above-described embodiment is merely an example of implementation of the present invention, and may be modified as follows. In addition, the embodiment and the modifications may be combined as needed. When the embodiment and the modifications are combined, the invention may be implemented by assigning priorities to the modifications (by assigning a priority that decides which modification will be given priority when an event occurs that competes when modifications are implemented).

Also, as a specific combination method, a method may be employed in which modifications in which different parameters are used for obtaining a common value (e.g., non-backlight time slot) are combined, and the common value is obtained by using the parameters together, for example. Also, a configuration may also be employed such that one value is obtained by adding up values obtained separately following some sort of rule. Also, when obtaining the common value, different weighting may be performed on parameters to be used.

2-1 Aging Degradation of Facility

Time slot specifying unit 102 may consider the aging degradation of each facility (the degradation of a facility over time) when specifying non-backlight time slots. In this modification, time slot specifying unit 102 reduces the non-backlight time slot as the period indicating the aging degradation of a facility (hereinafter, referred to as a "degradation period") increases. The degradation period is a period that has passed since the installation of a facility, for example. The installation as mentioned here includes installation by setting up, building, moving, constructing, or assembling, in addition to an installation by placing or attaching a facility.

FIG. 12 shows an example of the facility information of this modification. In FIG. 12, facility information storage unit 101 stores, in addition to the items shown in FIG. 7, facility information associated with installation date (year and month of installation). When specifying the non-backlight time slot, time slot specifying unit 102 reads out the installation date of the base station to be inspected, and calculates the degradation period. Note that the period that has passed since a facility was repaired may also be used as the degradation period, instead of the installation date, when the repair date (year and month of repair) of the facility is stored.

When the period that has passed since the repair of a facility is used, time slot specifying unit 102 reads out the repair date of the base station to be inspected when specifying the non-backlight time slots, and calculates the degradation period. Time slot specifying unit 102 specifies the non-backlight time slots using a time slot table in which a degradation period of a facility is associated with the length of the backlight time slot.

FIG. 13 shows an example of the time slot table. In the example of FIG. 13, degradation periods "Less than Th1", "Th1 or more and less than Th2", and "Th2 or more" are respectively associated with the backlight time slot length "50 minutes", "60 minutes", and "70 minutes".

Time slot specifying unit 102 specifies the time slot having a length associated with the degradation period calculated as described above as the backlight time slot. For example, when the shooting direction A12 of base station 51 shown in FIG. 8A is oriented true south, and the degradation period of base station 51 is Th2 or more, time slot specifying unit 102 specifies a time slot including a period of 35 minutes before and after the time at which the sun is true south (70 minutes in total) that has been calculated as described above as the backlight time slot.

Also, when the degradation period of base station 51 is less than Th1, time slot specifying unit 102 specifies a time slot including a period of 25 minutes before and after the time at which the sun is true south (50 minutes in total) that has been calculated as described above as the backlight time slot. In order to not overlook a smaller degraded part, damaged part, and the like, as the degradation of a facility progresses, it is necessary to perform inspection with a clear image that is not taken in a backlight condition. In this modification, as described above, the non-backlight time slot is reduced as the degradation period increases, that is, the length of the backlight time slot is increased.

In the backlight time slot, the degree of backlight is not always the same, and gradually increases and then gradually decreases with the vicinity of central time serving as a boundary. Therefore, as the length of the backlight time slot increases, the likelihood of an image being taken in a backlight-like condition decreases. On the other hand, if the length of the backlight time slot is increased for all facilities regardless of the degradation period, as the length of non-backlight time slots decreases, the number of base station candidates that can be shot in one day decreases, and as a result, the likelihood that the number of days needed to take photographs will increase (shooting period will increase) increases.

As the shooting period increases, the cost (personnel expense, transportation expense, and the like) increases, and other operations may be influenced. In this modification, as a result of taking the degradation period into consideration as described above, the backlight time slot for a base station for which a clearer image is required is increased, but the backlight time slot is reduced for a base station whose degradation period is short and for which inspection can be performed with an image taken in a more or less backlight-like condition, and as a result, the balance between improvement in inspection accuracy and reduction in shooting periods can be achieved.

2-2 Locational Conditions of Facility

Time slot specifying unit 102 may take locational conditions of each facility into consideration when specifying a non-backlight time slot. For example, a base station along a coast soon rusts because sea breeze blows against the base station, compared with a base station in an inland area. In terms of rusting, the same consideration can be applied to a base station close to a factory that discharges smoke including chemical substances, and a base station in a rainy area.

Also, in a base station in an area in which lightning frequently occurs, there are cases where the electric facility is quick to deteriorate, compared with a base station in an area lightning less frequently occurs. Therefore, in this modification, time slot specifying unit 102 reduces the length of the non-backlight time slot for facilities under specific locational conditions, compared with facilities that are not under the specific locational conditions. The areas under the specific locational conditions include an area along a coast, an area close to a factory, a rainy area, an area in which lightning is frequent, and the like, as described above, and are areas in which factors for accelerating degradation are present, for example.

Time slot specifying unit 102 stores map information, and determines that the locational conditions are "along a coast" with respect to a base station whose distance from a coast line is less than a threshold value, for example. Note that time slot specifying unit 102 may also determine the locational conditions "along a coast" using map information indicating the range of an area along a coast. Time slot specifying unit 102 specifies non-backlight time slots using a time slot table in which locational conditions are associated with lengths of backlight time slots.

FIG. 14 shows an example of the time slot table of this modification. In the example in FIG. 14, locational conditions "Along a coast", "Not along a coast" are respectively associated with lengths of backlight time slot "60 minutes" and "50 minutes". If it is determined that the locational conditions of base station 51 are "Along a coast", time slot specifying unit 102 specifies a time slot including a period of 30 minutes before and after the time at which the sun is true south (60 minutes in total) as the backlight time slot, for example.

Also, if it is determined that the locational conditions of base station 51 are "Not along a coast", time slot specifying unit 102 specifies a time slot including a period of 25 minutes before and after the time at which the sun is true south (50 minutes in total) as the backlight time slot. As a result of performing specification using the time slot table in FIG. 14, time slot specifying unit 102 reduces the length of the non-backlight time slot for a facility under specific locational conditions (e.g., along a coast) compared with a facility that is not under the specific locational conditions.

As described above, in this modification, the length of non-backlight time slot is reduced for a base station under locational conditions in which degradation is likely to be accelerated compared with a base station under locational conditions in which degradation is unlikely to be accelerated, that is, the length of the backlight time slot increases. Therefore, when base stations that are not under the same locational conditions are present, a balance between improvement in inspection accuracy and reduction in shooting period can be achieved, similarly to the modification described above. Note that time slot specifying unit 102 may, in addition to simply determining whether or not a base station is under specific locational conditions, reduce the length of the non-backlight time slot as the degree by which the degradation of a facility is accelerated due to the influence of the locational conditions increases.

The degree by which the degradation of a facility is accelerated can be determined using the distance from a coast (the degree by which the degradation of a facility is accelerated is larger under locational conditions where the distance from a coast is less than a threshold value than under locational conditions where the distance from a coast is a threshold value or more), for example. As described above, as a result of determining the degree by which the degradation is accelerated in detail, the balance between improvement in inspection accuracy and reduction in the shooting period can be accurately achieved, compared with a case where detailed determination is not performed.

2-3 Performance of Shooting Means

When specifying the non-backlight time slot, time slot specifying unit 102 may also take the performance of a shooting means included in a flying body into consideration. For example, when the shooting means includes a lens immune to backlight or the shooting means is equipped with specific functions such as an exposure correction function and daytime synchronizing function (function of firing electronic flash in a daytime), a clear image can be shot even in a backlight-like condition.

Therefore, in this modification, if camera 28 of drone 20 has a specific function, time slot specifying unit 102 increases the length of the non-backlight time slot compared with a case where camera 28 does not have a specific performance. The specific function is a function that contributes to shooting of a clear image even in a backlight condition, and is a function including t a lens immune to backlight, an exposure correction function, a daytime synchronizing function, or the like is included, as described above, for example. Time slot specifying unit 102 specifies the length of the non-backlight time slot using a time slot table in which specific performance is associated with the length of the non-backlight time slot.

FIG. 15 shows an example of the time slot table of this modification. In the example in FIG. 15, specific functions "None", "Lens immune to backlight", "Exposure correction function/daytime synchronizing function" are respectively associated with the lengths of backlight time slot "60 minutes", "50 minutes", and "40 minutes". In this modification, it is assumed that functions with which drone 20 is equipped are registered in sever apparatus 10 in advance. If the performance "Lens immune to backlight" with which camera 28 of drone 20 is equipped is registered, time slot specifying unit 102 specifies a time slot including a period of 25 minutes before and after the time at which the sun is true south (50 minutes in total) that has been calculated as described above as the backlight time slot, for example.

Also, if the performance "Daytime synchronizing function" with which camera 28 is equipped is registered, time slot specifying unit 102 specifies a time slot including a period of 20 minutes before and after the time at which the sun is true south (40 minutes in total) as the backlight time slot. Note that if camera 28 is equipped with a plurality of functions, time slot specifying unit 102 may specify the shortest time slot, out of time slots associated with the functions, or may specify a time slot (e.g., 30 minutes) obtained by further reducing the shortest time slot because immunity to backlight improves due to a plurality of functions.

There are cases where a plurality of drones for inspection are operated because there is a very large number of base stations. In this case, in this modification, with respect to a drone equipped with a specific function described above (a function that contributes to shooting of a clear image even in a backlight condition), an operation plan is generated while increasing the length of the non-backlight time slot compared with a drone that is not equipped with the specific function. Therefore, the degree of freedom of facilities that can be incorporated in an operation plan can be improved by increasing the length of the non-backlight time slot as long as possible while maintaining the level of inspection accuracy.

2-4 Shooting Direction

In the embodiment, two, three, and four shooting directions are determined, but the number of shooting directions is not limited thereto. For example, only one direction may be determined as the shooting direction, and five or more directions may also be determined as the shooting direction. Also, all 360 degree directions may also be shooting directions by making a flight while helicoidally rotating around a facility.

2-5 Facility that is Invariably in Backlight Condition

In a facility for which many shooting directions are determined, a situation may occur in which a backlight condition is invariably satisfied in a shooting direction regardless of the time slot in which shooting is performed, or the period of time for shooting is insufficient even if a time slot in which backlight condition is not satisfied is present. When such a situation arises, an operation plan for shooting a facility using two separate flights may be generated.

In this modification, the time needed for shooting is included in the facility information.

FIG. 16 shows an example the facility information of this modification. In the example in FIG. 16, facility information storage unit 101 stores facility information in which shooting time (time needed for shooting) is associated in addition to the items shown in FIG. 7. Operation plan generating unit 104 determines, for each facility, whether the length of the non-backlight time slot specified by time slot specifying unit 102 is less than the shooting time by referring to the stored facility information.

Operation plan generating unit 104 generates an operation plan, for a facility with respect to which the above determination has been made, such that a first shooting is performed in which shooting is performed while excluding shooting directions in a backlight condition, and a second shooting is performed in which shooting in the excluded shooting directions (that were excluded because a backlight condition was achieved in the first shooting) is performed in a time slot in which the shooting directions are not in a backlight condition.

Figure 17A:
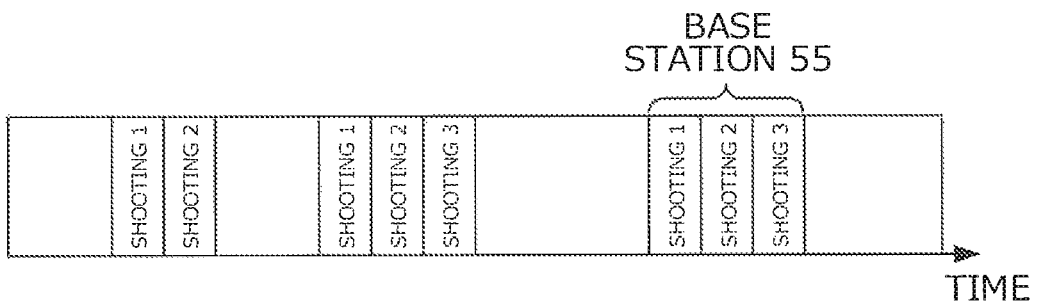
FIG. 17A is a diagram illustrating an example of an operation plan to be generated in a modification according to the present invention.
Figure 17B:
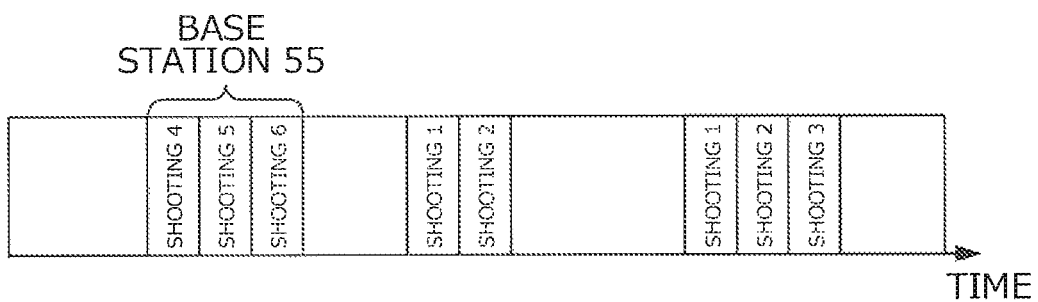
FIG. 17B is a diagram illustrating an example of an operation plan to be generated in a modification according to the present invention.

FIGS. 17A and 17B show an example of the operation plan to be generated in this modification. It is assumed that six shooting directions are determined for base station 55, and the length of the non-backlight time slot is less than the shooting time.

In the case of the example in FIGS. 17A and 17B, operation plan generating unit 104 generates an operation plan shown in FIG. 17A in which shooting is performed in the afternoon in three shooting directions (that are not in a backlight condition in the afternoon) of base station 55, and an operation plan shown in FIG. 17B in which shooting is performed in the morning in the three remaining shooting directions of base station 55 (that are not in a backlight condition in the morning). As described above, according to this modification, an image that is not taken in a backlight condition can be shot for a facility for which the backlight condition is invariably satisfied in a shooting direction regardless of the time slot in which shooting is performed.

Note that, in the example in FIGS. 17A and 17B, operation plan generating unit 104 generated an operation plan such that the second shooting is performed on a day different from the day on which the first shooting is performed, but may also generate an operation plan such that the second shooting is performed on the same day on which the first shooting is performed. Also, when there are a plurality of facilities for which a backlight condition is invariably satisfied in a shooting direction, operation plan generating unit 104 may generate the operation plan as follows.

Figure 18:
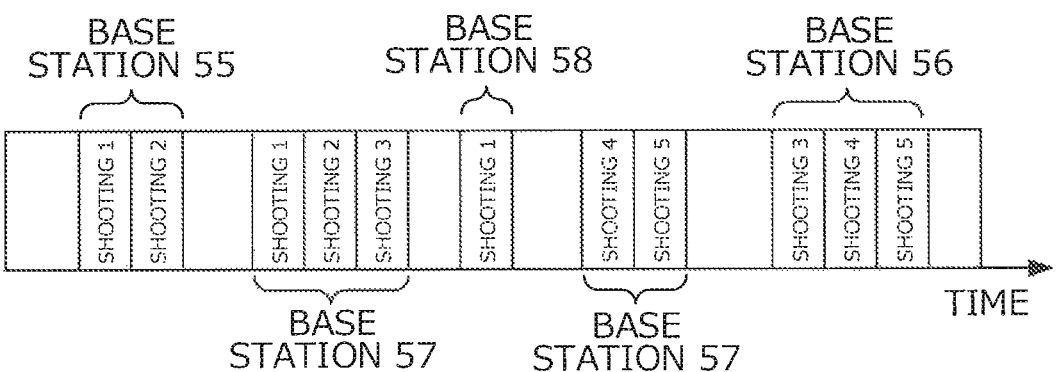
FIG. 18 is a diagram illustrating an example of an operation plan to be generated in a modification according to the present invention.

FIG. 18 shows an example of the operation plan to be generated in this modification. It is assumed that five shooting directions are determined for each of base stations 56 and 57, and the length of the non-backlight time slot is less than the shooting time in each of base stations 56 and 57. When a plurality of facilities are present for which second shooting is needed, as is the case with base stations 56 and 57, operation plan generating unit 104 generates an operation plan such that the second shooting for the plurality of facilities for which second shooting is needed is performed, in a sequence opposite to the sequence of the first shooting.

In the example in FIG. 18, operation plan generating unit 104 generates an operation plan in which shooting in two shooting directions is first performed for base station 56, shooting in three shooting directions is then performed for base station 57, subsequent shooting in one shooting direction is performed for base station 58, thereafter shooting in the remaining two shooting directions is then performed for base station 57 as the second shooting, and finally shooting in the remaining three shooting directions is performed for base station 56 as the second shooting.

When the operation plan shown in FIG. 18 is used, an inspector need only perform shooting, after visiting base stations 56, 57, and 58 in this order, by moving back to base stations 57 and 56 in this order on the same route. In this modification, the same route can be used for an outgoing trip and a return trip as described above, and therefore movement between base stations can be smoothly performed, compared with the case where the second shooting is performed on a different day, for example.

2-6 No-Sunlight Condition

Under a condition that it is cloudy and that is void of direct sunlight, shooting can be performed without giving consideration to backlight. Operation plan generating unit 104 may also generate an operation plan taking a no-sunlight condition due to it being cloudy or the like into consideration.

Figure 19:
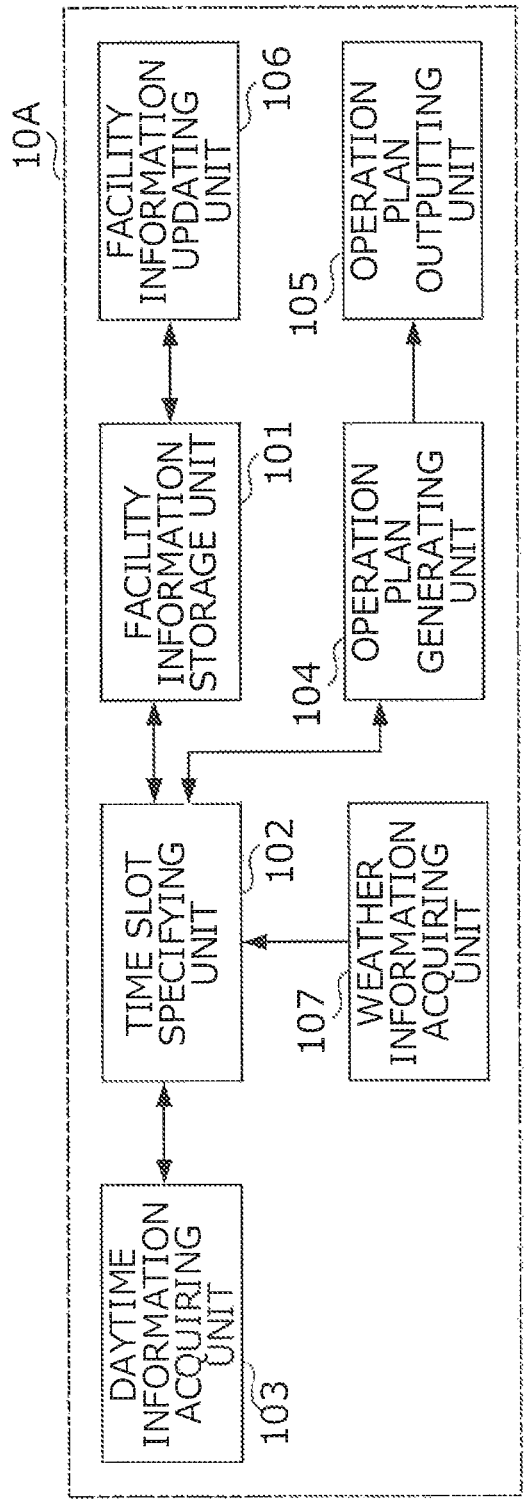
FIG. 19 is a diagram illustrating a functional configuration realized by a sever apparatus of a modification according to the present invention.

FIG. 19 shows a functional configuration realized by sever apparatus 10a of this modification. Sever apparatus 10a includes weather information acquiring unit 107 in addition to the units shown in FIG. 6. Weather information acquiring unit 107 acquires weather information indicating the weather in an area in which a facility to be inspected is located. Weather information acquiring unit 107 acquires a weather forecast for an area in which the facility to be inspected is located, as the weather information, from a service providing weather forecasts for areas on the Internet, for example.

Weather information acquiring unit 107 acquires weather information for an operation period indicated by the operation plan, and supplies the acquired weather information to time slot specifying unit 102. Time slot specifying unit 102 further specifies a time slot in which no sunlight is expected for a base station to be inspected, in addition to specifying non-backlight time slots for the base station to be inspected. A time slot in which no sunshine is expected will be referred to as a "no-sunshine time slot". The no-sunshine time slot is an example of a "second time slot" of the present invention.

Time slot specifying unit 102 specifies, for a day for which "cloudy" is forecast throughout the day, a time slot from sunrise to sunset as the no-sunshine time slot, for example. Also, time slot specifying unit 102 specifies, for a day for which "cloudy, fine later" is forecast, a time slot from sunrise to the time at which the sun is true south as the no-sunshine time slot, for example. Also, time slot specifying unit 102 does not specify the no-sunshine time slot, for a day for which "sunny temporarily cloudy" and "sunny with occasional clouds" are forecast, because it is not clear when it is cloudy.

Also, time slot specifying unit 102 does not specify the no-sunshine time slot, for a day for which "rain" is forecast, because, while no sunlight is expected, the conditions are not suitable for shooting. However, when a waterproof function of a drone has improved or when some contrivance is implemented such that raindrops do not stick to a lens of the camera, time slot specifying unit 102 may specify the no-sunshine time slot for a day for which "rain" is forecast as well.

Time slot specifying unit 102 specifies the non-backlight time slot for a day for which a no-sunshine time slot is specified as well, assuming that it will be fine on the specified day. Time slot specifying unit 102 supplies the no-sunshine time slot specified in this way to operation plan generating unit 104 along with information regarding the non-backlight time slot and the like. Operation plan generating unit 104 generates an operation plan in which, in a no-sunshine time slot specified by time slot specifying unit 102, shooting of a facility is prioritized for which the non-backlight time slot is short if it is assumed that the sun will appear in the specified no-sunshine time slot.

In the case of base stations 55, 56, and 57 shown in FIGS. 17A, 17B, and 18, because the non-backlight time slot of base station 55 whose number of shooting directions is six is the shortest, operation plan generating unit 104 generates an operation plan in which base station 55 is shot in the specified no-sunshine time slot, for example. Also, if it is possible to perform shooting of one more base station in the same no-sunshine time slot, operation plan generating unit 104 generates an operation plan in which a base station, out of base stations 56 and 57, whose supplied non-backlight time slot is shorter is shot.

Note that, if it is not possible to return to base during business hours when shooting is performed for a base station, of stations 56 and 57, whose non-backlight time slot is shorter, because the movement time increases, operation plan generating unit 104 may generate an operation plan in which shooting is performed for the base station whose non-backlight time slot is next shortest (if it is possible to return to base during the business hours).

As the non-backlight time slot of a base station decreases, it is more difficult to generate an operation plan for shooting the base station without the influence of backlight. Therefore, it is necessary to perform second shooting as described above, and to perform shooting after waiting until the backlight is resolved by consuming a longer period of time than a normal shooting time depending on the case, but in any case, the shooting period tends to increase. In this modification, shooting, on a day of no sunlight, of a facility whose non-backlight time slot is short and that is likely to be influenced by backlight is prioritized, and therefore the shooting period can be easily shortened compared to the case where the sunshine condition is not considered.

Note that the method of selecting a base station to be shot in a no-sunshine time slot is not limited to the method described above. If a plurality of facilities are present whose non-backlight time slot is less than a threshold value when it is assumed that the sun will appear in the no-sunshine time slot, operation plan generating unit 104 may generate an operation plan in which a facility whose distance between facilities is short is further prioritized. For example, in base stations 55, 56, and 57, distance L1 between base stations 55 and 56, distance L2 between base stations 55 and 57, and distance L3 between base stations 56 and 57 are assumed to be L1>L2>L3.

In this case, although the non-backlight time slot of base station 55 is longest, the distance between base stations 56 and 57 is the shortest among the distances between base stations, and therefore operation plan generating unit 104 generates an operation plan in which, if base stations 56 and 57 can be shot in the specified no-sunshine time slot, base stations 56 and 57 are shot in the specified no-sunshine time slot. As a result of using a method of taking the distances between facilities into consideration, a plurality of base stations whose non-backlight time slot is short are likely to be collectively shot, compared with a case of not taking the distances between facilities into consideration, and as a result, the shooting period is likely to be shortened.

2-7 Change of Plan

Operation plan generating unit 104 may generate a new operation plan by changing one generated operation plan. In this modification, even on a day on which an operation plan is executed, weather information acquiring unit 107 regularly acquires weather information in real time, and supplies the acquired weather information to time slot specifying unit 102. Time slot specifying unit 102 updates the no-sunshine time slot based on the supplied weather information, and supplies the updated no-sunshine time slot to operation plan generating unit 104.

If a no-sunshine time slot is specified after an operation plan has been generated based on a specified non-backlight time slot, operation plan generating unit 104 changes the operation plan such that a facility that is scheduled to not be shot due to backlight is to be shot in the specified no-sunshine time slot.

Figure 20A:
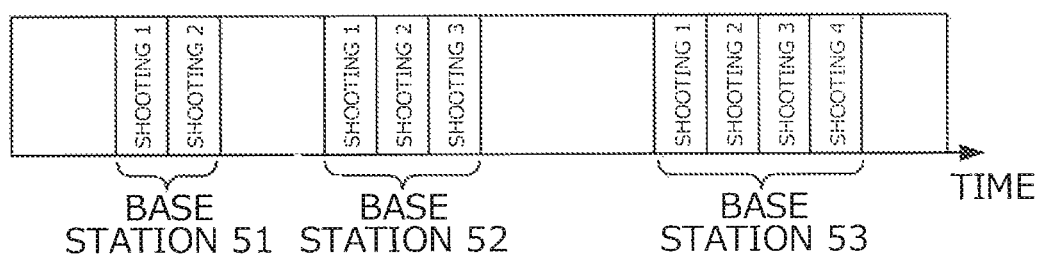
FIG. 20A is a diagram illustrating an example of an operation plan to be generated in a modification according to the present invention.
Figure 20B:
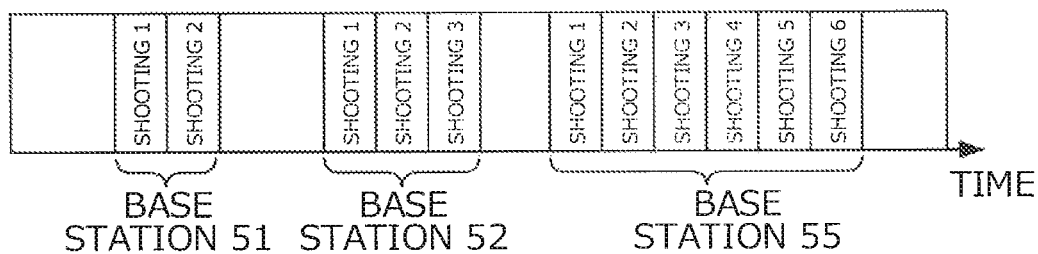
FIG. 20B is a diagram illustrating an example of an operation plan to be generated in a modification according to the present invention.

FIGS. 20A and 20B show an example of the operation plan to be generated in this modification. Operation plan generating unit 104 first generates an operation plan in which base stations 51, 52, and 53 at three positions are to be shot as shown in FIG. 20A for a day for which a weather forecast indicated by the weather information is fine.

Then, it is assumed that the weather forecast indicated by the weather information acquired in the morning on the planned day (weather forecast is fine) has changed to sunny then cloudy. Then, operation plan generating unit 104 generates an operation plan in which base station 53 to be shot in the afternoon is changed to base station 55 that will include a backlight time slot in the afternoon if the sun appears, as shown in FIG. 20B. In the examples in FIGS. 20A and 20B, operation plan generating unit 104 changes the operation plan to a plan in which a facility whose non-backlight time slot specified when the sun appears is less than the shooting time is to be shot (base station 55 in the examples in FIGS. 20A and 20B), which was scheduled to not be shot due to backlight.

Note that operation plan generating unit 104 need not always change the operation plan when the weather forecast changes to sunny then cloudy. For example, when the no-sunshine time slot is specified after generating an operation plan, operation plan generating unit 104 may change the operation plan to a plan in which another facility (that was scheduled to not be shot due to backlight) is to be shot in the specified no-sunshine time slot, based on a predetermined condition (that is, if the predetermined condition is satisfied).

A condition that is satisfied when a following condition is satisfied is used as the predetermined condition, namely a condition that the priority, which is determined in advance, of a facility that was scheduled to not be shot due to backlight is a threshold value or more, a condition that the shooting time of the facility is a threshold value or more, and a condition that the efficiency improves if the flight plan is changed compared to the flight plan before change (e.g., the shooting time increases, remainder of business hours decreases, or the like), for example.

Also, if there are a plurality of facilities whose non-backlight time slot specified when the sun appears is less than the shooting time, operation plan generating unit 104 may generate an operation plan in consideration of the fact that the facility whose specified non-backlight time slot is the shortest satisfies the predetermined condition. Note that, in this modification, because the operation plan under execution is changed, and therefore there are cases where the facility desired to be prioritized is too far depending of the current positions of drone 20 and the inspector.

Therefore, when movement is performed from the current position of drone 20 to another facility that was scheduled to not be shot due to backlight, and the facility at the movement destination is shot, if it is possible to arrive at the point of destination (e.g., base at which drone 20 is deployed) in the operation plan before change, operation plan generating unit 104 determines that the predetermined condition is satisfied and changes the operation plan. In the examples in FIGS. 20A and 20B, it is assumed that the weather has changed during shooting of second base station 52 and it is cloudy in the afternoon, for example.

Then, after ending shooting of base station 52, when movement to base station 55 and shooting of base station 55 are performed, if it is possible to reach the base, operation plan generating unit 104 changes the operation plan. The changed operation plan is output to user terminal 40 and displayed. The inspector, although intended to move to base station 53 after ending shooting of base station 52, switches to moving to base station 55 as a result of seeing the display on user terminal 40.

In this modification, as a result of changing the operation plan as described above, shooting of facilities that are difficult to be shot collectively unless being under a no-sunlight condition (e.g., base station 55) can be completed in a shorter period, compared to the case where the operation plan is not changed. As a result, the shooting period can be easily shortened, compared with a case where the change in operation plan is not performed, as in this modification.

2-8 Autonomous Flight

In the embodiment, an inspector operates drone 20 using proportional controller 30, but there is no limitation thereto. For example, a configuration may be employed in which flight data indicating a flight path (information including latitude, longitude, altitude, flight direction, flight speed, and the like), shooting timing, and shooting directions is given to drone 20, and drone 20 is allowed to perform autonomous flight based on the provided flight data. The autonomous flight of drone 20 may be performed only at the time of shooting a base station, or may also be performed during movement between base stations. When autonomous flight is performed, the change in operation plan, which is described in the above modification, may be transmitted to drone 20 through wireless communication such as mobile communication.

2-9 Output Destination of Operation Plan

Operation plan outputting unit 105 outputs an operation plan to user terminal 40, in the embodiment, but there is no limitation thereto. Operation plan outputting unit 105 may output an operation plan to proportional controller 30, for example. When an operation plan is output to proportional controller 30, the operation plan is displayed in a display of proportional controller 30. Also, when drone 20 performs an autonomous flight, operation plan outputting unit 105 may output an operation plan to drone 20. Then, as a result of operation plan generating unit 104 generating an operation plan including the aforementioned flight data to be used for the autonomous flight, drone 20 can perform the autonomous flight based on the operation plan that has been output.

2-10 Flying Body

In the embodiment, a rotary-winged flying body is used as the flying body that flies autonomously, but there is no limitation thereto. The flying body may be an airplane-type flying body or may be a helicopter-type flying body, for example. In short, any flying body that can make a flight in accordance with an instruction given by a user (instruction in real time from a proportional controller, an instruction for causing the flight body to fly along a predetermined flight path, or the like) can be used.

2-11 Apparatuses Realizing Functions

The apparatus that realizes the functions shown in FIG. 6 and the like are not limited to the apparatuses described above. For example, the functions realized by server apparatus 10 may also be realized by user terminal 40. In this case, user terminal 40 is an example of the "information processing apparatus" of the present invention. In short, it is sufficient that the functions shown in FIG. 6 and the like are realized in facility inspection system 1 as a whole.

2-12 Category of the Invention

The present invention may be understood as, other than information processing apparatuses such as server apparatus 10 and user terminal 40, an information processing system (facility inspection system 1) including the information processing apparatuses and flying body such as drone 20. The present invention can also be understood as an information processing method for realizing the processing implemented by the information processing apparatuses, or as a program for causing a computer to control the information processing apparatuses. The program that is understood as the present invention may be provided in the form of a recording medium such as an optical disk where the program is stored, or may be provided in the form in which a computer is caused to download the program via a network such as the Internet, and the downloaded program is installed so as to be usable, or the like.

2-13 Functional Blocks

Note that the block diagrams used in the description of the embodiment described above show blocks of functional units. These functional blocks (constituent units) are realized by any combination of at least one of hardware and software. The method of realizing the function blocks is not limited in particular.

That is, the functional blocks may be realized by using one apparatus in which the functional blocks are physically or logically connected, or may be realized by directly or indirectly connecting two or more apparatus that are physically or logically separated (using, for example, a wired connection, a wireless connection, or the like), and using the plurality of these apparatus. Functional blocks may also be realized by combining the one apparatus or the plurality of apparatus with software.

Examples of functions include determining, deciding, judging, calculating, computing, processing, deriving, investigating, searching, confirming, receiving, transmitting, outputting, accessing, solving, selecting, setting, establishing, comparing, assuming, expecting, considering, broadcasting, notifying, communicating, forwarding, configuring, reconfiguring, allocating, mapping, assigning, and the like, but these are no limitation thereto. For example, a functional block (constituent unit) that enables transmission function is called a transmitting unit or a transmitter. In any case, as described above, the method of realizing a function is not particularly limited.

2-14 Handling of Input/Output Information and the Like

Information and the like that has been input/output may be saved in a specific location (for example, a memory), or may be managed using a management table. The information and the like that is input/output can be overwritten, updated, or added to. Information and the like that has been output may be deleted. Information and the like that has been input may also be transmitted to another apparatus.

2-15 Determination Method

Determination may be performed according to a value (0 or 1) represented by 1 bit, or may be performed according to a Boolean value (Boolean: true or false), or may be performed by comparing numerical values (for example, comparison with a predetermined value).

2-16 Processing Procedure and the Like

The processing procedures, sequences, flowcharts, and the like of the modes and embodiments described in this disclosure may be carried out in different orders as long as doing so does not create conflict. For example, in the methods described in the present disclosure, the elements of various steps are presented in an exemplary order, and the order is not limited to the specific order presented here.

2-17 Handling of Input/Output Information and the Like

Information and the like that has been input/output may be saved in a specific location (for example, a memory), or may be managed using a management table. The information and the like that is input/output can be overwritten, updated, or added to. Information and the like that has been output may be deleted. Information and the like that has been input may be transmitted to another apparatus.

2-18 Software

Regardless of whether software is referred to as software, firmware, middleware, microcode, hardware description language, or by another name, "software" should be interpreted broadly as meaning commands, command sets, codes, code segments, program codes, programs, sub programs, software modules, applications, software applications, software packages, routines, subroutines, objects, executable files, execution threads, sequences, functions, and the like.

Also, software, commands, information, and the like may be exchanged over a transmission medium. For example, when software is transmitted from a website, a server, or another remote source using wired technologies such as coaxial cable, fiber optic cable, twisted pair cabling, or digital subscriber line (DSL), and/or wireless technologies such as infrared light or microwaves, at least one of these wired technologies and wireless technologies is included in the definition of "transmission medium".

2-19 Information and Signals

The information, signals, and the like described in the present disclosure may be expressed using any of a variety of different techniques. For example, data, instructions, commands, information, signals, bits, symbols, chips, and the like that may be referred to throughout all of the foregoing descriptions may be expressed by voltages, currents, electromagnetic waves, magnetic fields or magnetic particles, photo fields or photons, or any desired combination thereof.

2-20 Determining

The term "determining" as used in this disclosure may encompass a wide variety of actions. For example, performing any action of judging, calculating, computing, processing, deriving, investigating, looking up, searching, inquiring (for example, searching in a table, a database, or another data structure), ascertaining or the like may be considered as performing an action of "determining".

Also, for example, performing any action of receiving (for example, receiving information), transmitting (for example, transmitting information), input, output, accessing (for example, accessing data in memory) or the like may be considered as performing an action of "determining". Also, performing any action of resolving, selecting, choosing, establishing, comparing, or the like may be considered as performing an action of "determining". That is, performing some action may be considered as performing an action of "determining". Also, the term "determining" may be replaced with "assuming", "expecting", "considering", or the like.

2-21 Meaning of "Based On"

The phrase "based on" used in the present disclosure does not mean "based only on" unless specifically mentioned. In other words, the phrase "based on" means both "based only on" and "based at least on".

2-22 "Different"

In the present disclosure, the phrase "A and B are different" may mean "A and B are different from each other". This phrase may mean that "A and B are each different from C". Terms such as "separate" and "connected" may be construed in a similar manner as "different".

2-23 "And" and "Or"

In the present disclosure, with respect to configurations that can be realized both as "A and B" and "A or B", a configuration described using one of these phrases may be used as a configuration described by the other of these phrases. For example, if the phrase "A and B" is used, "A or B" may be used as long as implementation is possible without conflicting with the other phrase.

2-24 Variations and the Like of Modes

The modes and embodiments described in the present disclosure may be used alone, may be combined, or may be switched according to how the invention is to be carried out. Additionally, notifications of predetermined information (for example, a notification that "X is true") are not limited to explicit notifications, and may be carried out implicitly (for example, the notification of the predetermined information is not carried out).

Although the foregoing has described the present disclosure in detail, it will be clear to one skilled in the art that the present disclosure is not intended to be limited to the embodiments described in the present disclosure. The present disclosure can be carried out in modified and altered forms without departing from the gist and scope of the present disclosure set forth in the appended scope of patent claims. As such, the descriptions in the present disclosure are provided for illustrative purposes only, and are not intended to limit the present disclosure in any way.

REFERENCE SIGNS LIST

1 Facility inspection system
2 Network
3 Base
10 Sever apparatus
20 Drone
30 Proportional controller
40 User terminal
101 Facility information storage unit
102 Time slot specifying unit
103 Daytime information acquiring unit
104 Operation plan generating unit
105 Operation plan outputting unit
106 Facility information updating unit
107 Weather information acquiring unit
401 Operation plan display unit
402 Operation result transmitting unit

What is claimed is:
1. An information processing apparatus comprising:
an acquiring unit configured to acquire daytime information at an installation position of a facility for which at least one shooting direction in which a flying body shoots the facility is determined;
a specifying unit configured to specify a backlight time slot based on a time at which the at least one shooting direction matches a direction of the sun indicated by the daytime information, and to specify a time slot obtained by removing the backlight time slot from a daytime time slot indicated by the daytime information as a first time slot in which a backlight condition fails to be satisfied in the at least one shooting direction for daylight shooting of the facility; and a generating unit configured to generate an operation plan that indicates a shooting time and a movement time for the facility, for the flying body to shoot the facility in the specified first time slot for inspecting the facility.

2. The information processing apparatus according to claim 1, wherein the specifying unit reduces a length of the first time slot upon elapse of a time from installation of the facility or a time from repair of the facility.

3. The information processing apparatus according to claim 1, wherein the specifying unit reduces a length of the first time slot for a facility that is subject to specific location conditions, relative to those for another facility that is not subject to the specific location conditions.

4. The information processing apparatus according to claim 1, wherein the specifying unit increases a length of the first time slot if a shooting means of the flying body is provided with a specific function, in contrast to a case where the shooting means is not provided with the specific function.

5. The information processing apparatus according to claim 1, wherein the generating unit generates the operation plan for performing, for a facility for which the first time slot is less than a time needed for shooting, a first shooting for performing shooting excluding a shooting direction in which the backlight condition is achieved, and a second shooting for performing shooting in the shooting direction excluded from the first shooting in a time slot in which the backlight condition fails to be satisfied in the shooting direction.

6. The information processing apparatus according to claim 1,
wherein the specifying unit further specifies a second time slot in which sunlight is not expected, and
the generating unit generates the operation plan to prioritize shooting, in the specified second time slot, for a facility for which the first time slot is short, the first time slot being specified assuming that the sun will appear in the second time slot.

7. The information processing apparatus according to claim 6, wherein the generating unit generates the operation plan to further prioritize, in the second time slot, if there are a plurality of facilities for each of which the first time slot is less than a threshold value, the first time slot being specified assuming that the sun will appear, a facility whose distance to another facility is short.

8. The information processing apparatus according to claim 1,
wherein the specifying unit further specifies a second time slot in which sunlight is not expected, and
the generating unit, if the second time slot is specified after generating the operation plan based on the first time slot, changes the operation plan to another plan to shoot another facility in the second time slot based on a predetermined condition.

9. The information processing apparatus according to claim 8, wherein, when the flying body moves from a current position to the other facility and shoots the other facility, if a point of destination of the operation plan can be arrived at, the generating unit changes the operation plan upon determining that the predetermined condition is satisfied when a priority of the other facility is a threshold value or more, when a shooting time of the other facility is a threshold value or more, or when efficiency improves if a flight plan is changed compared to the flight plan before change.

* * * * *